(12) United States Patent
Weeks et al.

(10) Patent No.: US 6,450,395 B1
(45) Date of Patent: Sep. 17, 2002

(54) METHOD AND APPARATUS FOR FRICTION STIR WELDING TUBULAR MEMBERS

(75) Inventors: Jack Lee Weeks, Scottsboro; Peter Oelgoetz, Huntsville, both of AL (US)

(73) Assignee: The Boeing Company, Seattle, WA (US)

( * ) Notice: Subject to any disclaimer, the term of this patent is extended or adjusted under 35 U.S.C. 154(b) by 77 days.

(21) Appl. No.: 09/629,675

(22) Filed: Aug. 1, 2000

(51) Int. Cl.⁷ ............................................... B23K 31/02
(52) U.S. Cl. .................... 228/112.1; 228/44.5; 228/49.3
(58) Field of Search ........................... 228/112.1, 44.5, 228/49.3, 49.1, 48; 219/60.7

(56) References Cited

U.S. PATENT DOCUMENTS

| | | | |
|---|---|---|---|
| 3,266,700 A | | 8/1966 | Bauer et al. |
| 3,604,612 A | * | 9/1971 | Miller et al. |
| 3,722,778 A | | 3/1973 | Rohrberg et al. |
| 3,844,468 A | | 10/1974 | Nelson et al. |
| 3,848,793 A | | 11/1974 | Herman |
| 3,888,405 A | | 6/1975 | Jones et al. |
| 4,067,490 A | | 1/1978 | Jones et al. |
| 4,542,276 A | * | 9/1985 | Van Den Berg |
| 4,552,609 A | | 11/1985 | Larsen |
| 4,619,396 A | | 10/1986 | Yamamoto |
| 4,709,729 A | * | 12/1987 | Harrison |
| 4,757,932 A | | 7/1988 | Benn et al. |
| 4,998,663 A | | 3/1991 | Cakmak et al. |
| 5,285,947 A | * | 2/1994 | Depperman |
| 5,444,902 A | * | 8/1995 | Casturo et al. |
| 5,460,317 A | | 10/1995 | Thomas et al. |
| 5,486,262 A | | 1/1996 | Searle |
| 5,524,813 A | * | 6/1996 | Pease |
| 5,558,265 A | | 9/1996 | Fix, Jr. |
| 5,573,229 A | * | 11/1996 | Lycan |
| 5,611,479 A | | 3/1997 | Rosen |
| 5,697,511 A | * | 12/1997 | Bampton |
| 5,697,544 A | | 12/1997 | Wykes |
| 5,697,545 A | | 12/1997 | Jennings et al. |
| 5,718,366 A | | 2/1998 | Colligan |
| 5,758,999 A | * | 6/1998 | Geise |
| 5,893,507 A | | 4/1999 | Ding et al. |
| 6,050,475 A | * | 4/2000 | Kinton et al. |
| 6,070,784 A | * | 6/2000 | Holt et al. |

\* cited by examiner

*Primary Examiner*—Tom Dunn
*Assistant Examiner*—Jonathan Johnson
(74) *Attorney, Agent, or Firm*—Alston & Bird LLP

(57) ABSTRACT

There is provided an apparatus for forming a weld joint between abutting ends of first and second tubular members. The welding apparatus includes a support ring defining an aperture therethrough. The support ring has first and second sides defining a channel therebetween. The first and second sides of the support ring define a plurality of supports spaced about the circumference of the support ring, each of which defines a gripping surface for contacting at least a portion of the exterior surface of a corresponding tubular member to thereby secure the abutting ends of the first and second tubular members at least partially within the aperture of the support ring. The welding apparatus includes at least one friction stir welding tool, which is movably and rotatably mounted within the channel defined by the support ring and projects toward the abutting ends of the first and second tubular members. In one embodiment, the welding apparatus includes a drive assembly and a motor in operable communication with the drive assembly for moving the rotating friction stir welding tool about the abutting ends of the first and second tubular members to thereby form the weld joint.

33 Claims, 7 Drawing Sheets

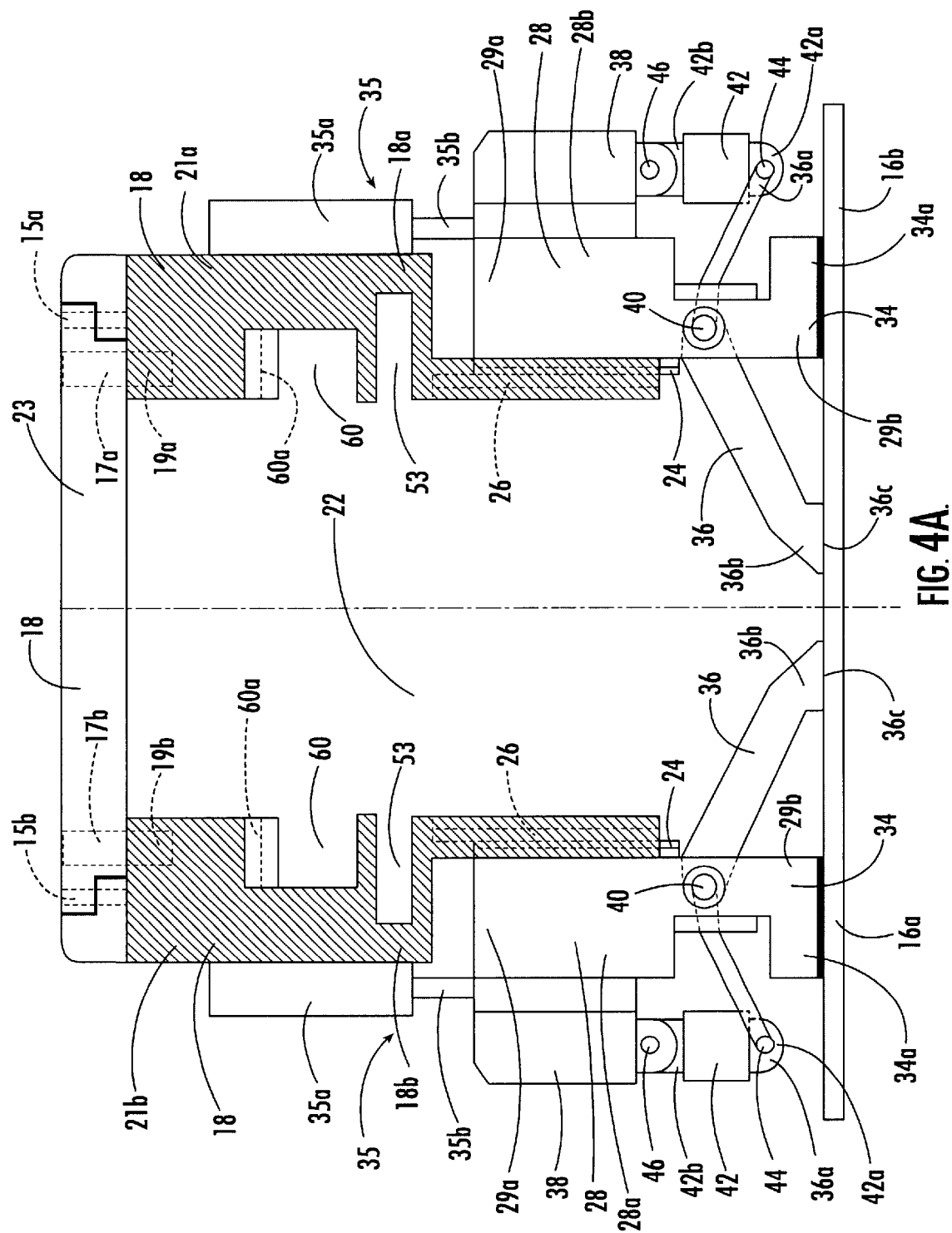

METHOD AND APPARATUS FOR FRICTION STIR WELDING TUBULAR MEMBERS

FIELD OF THE INVENTION

The present invention relates to friction stir welding and, more particularly, relates to friction stir welding tubular members.

BACKGROUND OF THE INVENTION

Friction stir welding is a relatively new process using a rotating tool having a pin or probe and a shoulder to join two workpieces in a solid state or to repair cracks in a single workpiece. For example, such a process is described in U.S. Pat. No. 5,460,317 to Thomas et al., the contents of which are incorporated herein by reference. As illustrated in FIG. 1, during friction stir welding, the probe 10a of the rotating tool 10 is plunged by a friction stir welding machine into a workpiece or between the faying faces of two workpieces 12 to produce the required resistance force to generate sufficient frictional heating to form a region of plasticized material. The tool 10 is typically tilted at an angle relative to the workpiece or workpieces 12 such that the trailing edge of the tool shoulder 10b is thrust into and consolidates the plasticized material created as the tool is moved along a path defined by the weld joint to be formed. Upon cooling of the plasticized material, the workpieces are joined along the weld joint. The magnitude of force exerted by the friction stir welding tool must be maintained above a prescribed minimum in order to generate the required frictional heating.

The force exerted by the friction stir welding tool produces a homogeneous weld joint having approximately 75% of the mechanical properties of the parent material, as opposed to approximately 50% for fusion weld joints. At present, however, the friction stir weld process is applied almost exclusively in straight-line welds. When joining workpieces having complex, curvilinear geometries, such as tubular members, moving the friction stir welding tool about the circumference of the workpieces and controlling the depth of the probe in the workpieces become problematic. In addition, when joining tubular members, such as adjacent lengths of tubing, it is also necessary to maintain the tubular members in coaxial alignment, which can be particularly difficult when applying a force of sufficient magnitude to generate the required frictional heating to form a region of plasticized material.

Thus, there is a need for an improved friction stir welding device for forming friction stir weld joints in workpieces having curvilinear geometries, such as tubular members. The welding device should be capable of effectively supporting the tubular members during welding. Additionally, the welding device should be capable of effectively translating a friction stir welding tool about the circumference of the tubular members and should be easily adaptable to varying tube geometries and sizes.

SUMMARY OF THE INVENTION

The present invention provides an apparatus for forming a weld joint between abutting ends of first and second tubular members. The welding apparatus includes a support ring defining an aperture therethrough. The support ring has first and second sides defining a channel therebetween. The first side of the support ring defines a plurality of supports spaced about the circumference of the support ring, each of which defines a gripping surface for contacting at least a portion of the exterior surface of the first tubular member to thereby secure the abutting end of the first tubular member at least partially within the aperture of the support ring. The second side of the support ring defines a plurality of supports spaced about the circumference of the support ring, each of which defines a gripping surface for contacting at least a portion of the exterior surface of the second tubular member to thereby secure the abutting end of the second tubular member at least partially within the aperture of the support ring adjacent to, and coaxially aligned with, the abutting end of the first tubular member. According to one embodiment, the first-side and second-side supports are slidably mounted to the support ring. According to another embodiment, the apparatus includes a plurality of actuator assemblies secured to the support ring. Each of the actuator assemblies is in operable communication with one of the supports for urging the support toward and away from the corresponding tubular member to thereby accommodate different diameter tubular members. According to still another embodiment, each of the first-side and second-side supports comprises a primary support, an alignment clamp pivotally attached to the primary support, and an actuator assembly in operable communication with the alignment clamp. In one embodiment, the actuator assembly is selected from a group consisting of a pneumatic actuator arm or a hydraulic actuator arm.

The welding apparatus includes a least one friction stir welding tool, which is movably and rotatably mounted within the channel defined by the support ring and which projects toward the abutting ends of the first and second tubular members. The welding apparatus also includes means, in operable communication with the at least one friction stir welding tool, for rotating the at least one tool, and means, in operable communication with the at least one friction stir welding tool, for moving the at least one tool about the abutting ends of the first and second tubular members to thereby form the weld joint. According to one embodiment, the rotating means comprises a rotatable spindle and a motor in operable communication with the spindle. According to another embodiment, the moving means comprises a drive assembly and a motor in operable communication with the drive assembly, and wherein the drive assembly is selected from a group consisting of a belt drive or a gear drive.

According to another embodiment, the welding apparatus includes at least one friction stir weld head movably mounted within the channel of the support ring. The at least one weld head includes a motor having a rotatable spindle and a friction stir welding tool rotatably mounted to the spindle of the motor. The welding apparatus also includes means, in operable communication with the at least one friction stir weld head, for moving the at least one weld head along a path defined by the channel of the support ring such that the rotating friction stir tool moves along a path defined by the abutting ends of the first and second tubular members to thereby form the weld joint. In one embodiment, the moving means includes a drive assembly and a motor in operable communication with the drive assembly, and wherein the drive assembly is selected from a group consisting of a belt drive or a gear drive.

According to still another embodiment, the welding apparatus includes means, in operable communication with the at least one friction stir welding tool, for urging the at least one friction stir welding tool toward and away from the abutting ends of the first and second tubular members in order to modify the force exerted by the friction stir welding tool on the abutting ends of the first and second tubular members. In one embodiment, the means for urging the at least one friction stir welding tool comprises a drive assembly and a motor, in operable communication with the drive assembly, and wherein the drive assembly is selected from a group consisting of a belt drive or a gear drive.

The present invention also provides a method of welding the abutting ends of first and second tubular members, including the steps of inserting the abutting end of a first tubular member into an aperture defined by a support ring. A plurality of supports defined by a first side of the support ring are moved into contact with at least a portion of the surface of the first tubular member such that the abutting end of the first tubular member is at least partially secured within the aperture defined by the support ring. The abutting end of a second tubular member is inserted into the aperture defined by the support ring such that the abutting end of the second tubular member is adjacent to, and coaxially aligned with, the abutting end of the first tubular member. A plurality of supports defined by the second side of the support ring are moved into contact with at least a portion of the surface of the second tubular member such that the abutting end of the second tubular member is at least partially secured within the aperture defined by the support ring and in coaxial alignment with the abutting end of the first tubular member. According to one embodiment, the moving steps comprise moving a primary support into contact with at least a portion of the surface of the corresponding tubular member and, thereafter, moving an alignment clamp into contact with at least a portion of the surface of the corresponding tubular member. According to another embodiment, tooling is positioned adjacent to the abutting ends of the first and second tubular members opposite of the friction stir welding tool to support the abutting ends of the first and second tubular members during friction stir welding.

The method also includes inserting at least one rotating friction stir welding tool into the abutting ends of the first and second tubular members to thereby join the abutting ends of the first and second tubular members by friction stir welding. According to one embodiment, the at least one rotating friction stir welding tool is moved through the first and second tubular members along a path that traces the abutting ends of the first and second tubular members to thereby form a continuous joint about the circumference of the first and second tubular members. According to another embodiment, the at least one friction stir welding tool is withdrawn from the abutting ends of the first and second tubular members after moving the at least one friction stir welding tool through the first and second tubular members.

Accordingly, there has been provided a welding device and associated method of manufacture for forming friction stir weld joints in workpieces having curvilinear geometries, such as tubular members. The welding device is capable of effectively supporting the tubular members during welding. Additionally, the welding device is capable of effectively translating a friction stir welding tool about the circumference of the tubular members and is easily adaptable to varying tube geometries and sizes.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein:

FIG. 4A is a cross-sectional view of a friction stir welding device illustrating the support ring, first-side support, and second-side support of the welding device, according to one embodiment of the present invention;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
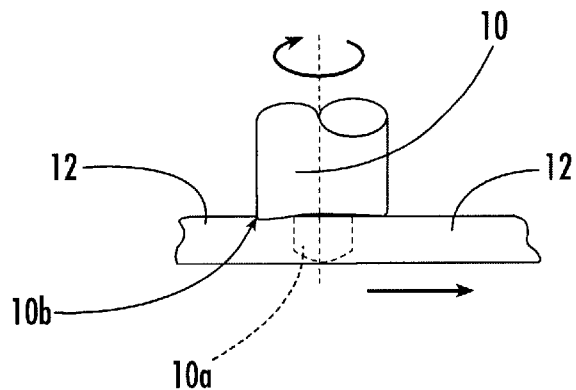
FIG. 1 is an elevational view illustrating the joining of two flat workpieces by friction stir welding along a straight-line weld, as is known in the art.
Figure 2A:
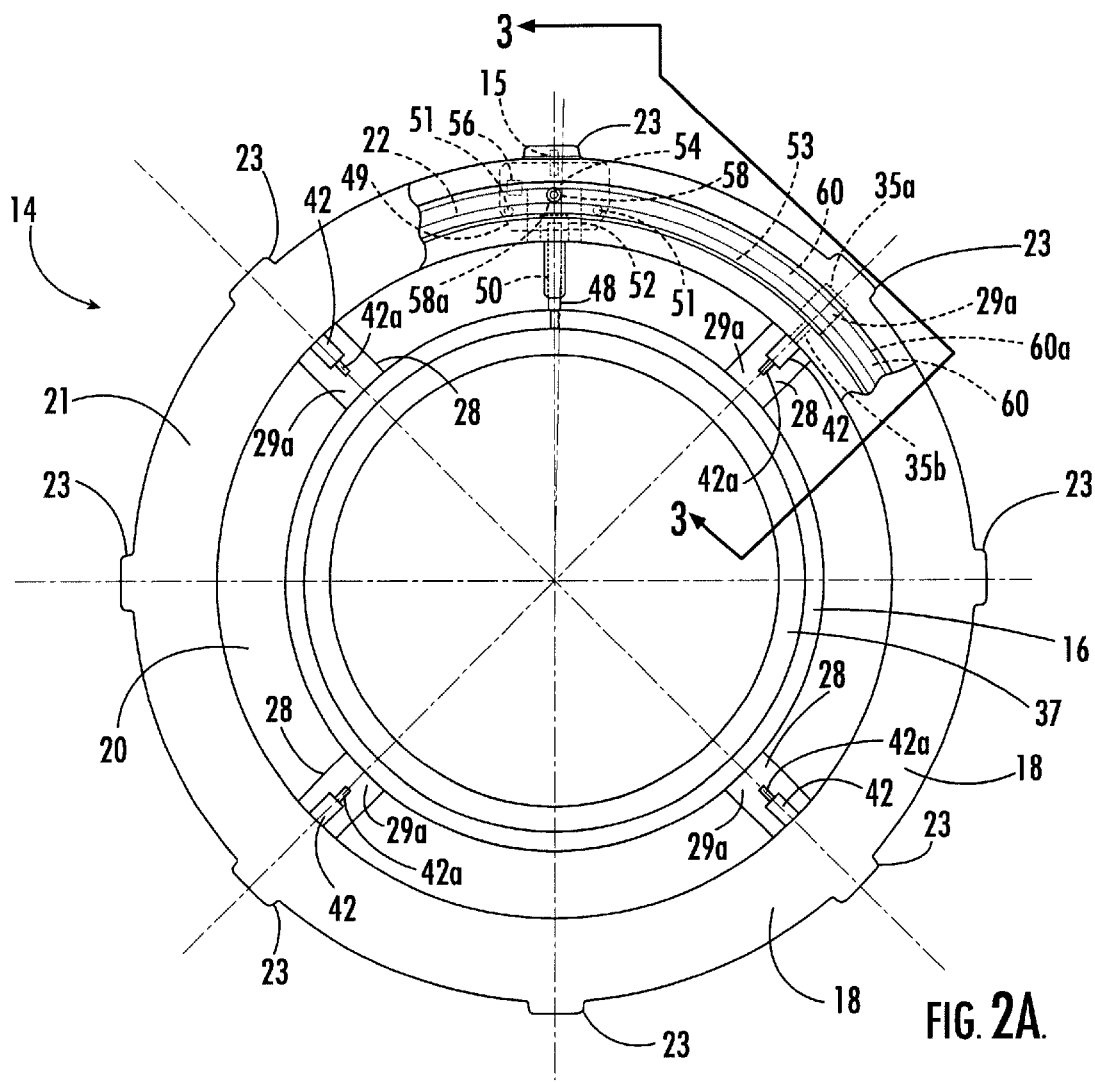
FIG. 2A is a partially cutaway, end elevational view illustrating a friction stir welding device, according to one embodiment of the present invention.
Figure 3:
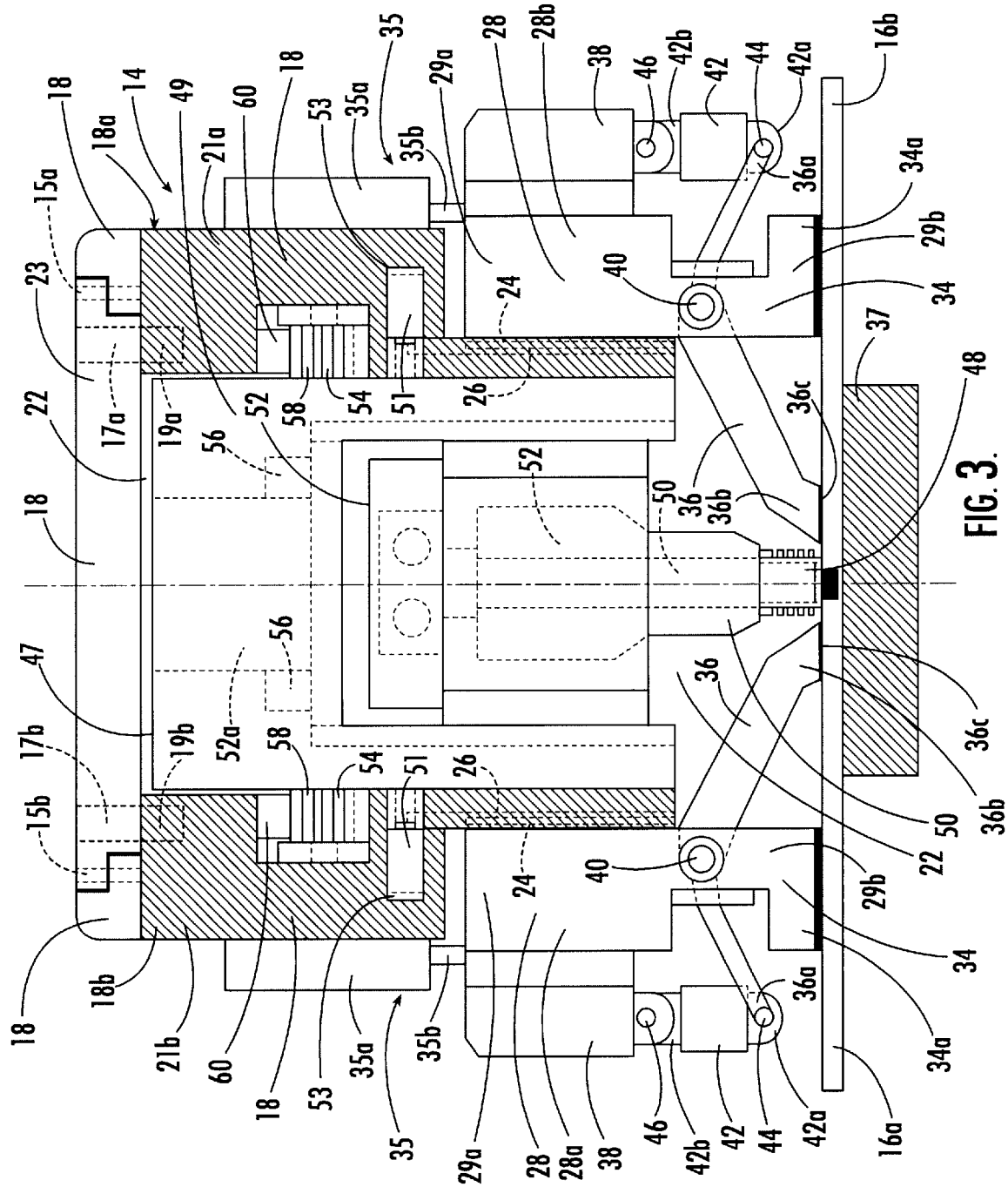
FIG. 3 is a cross-sectional view illustrating the welding apparatus of FIG. 2A along lines 3—3.

Referring now to the drawings and, in particular, to FIGS. 2A and 3, there is illustrated a friction stir welding device 14 for forming a weld joint between abutting ends of first and second tubular members 16a, b, such as lengths of tubing. The friction stir welding device 14 includes a support ring 18 having first and second sides 18a, b and defining an aperture 20 therethrough adapted to receive the abutting ends of the first and second tubular members 16a, b. As discussed more fully below, the first and second sides 18a, b of the support ring define a channel 22 therebetween. The support ring 18 is preferably constructed of a metal or metal alloy that has high strength and stiffness, and that is easily machinable. In one embodiment, the support ring is constructed of AISI 17-4PH stainless.

Figure 4B:
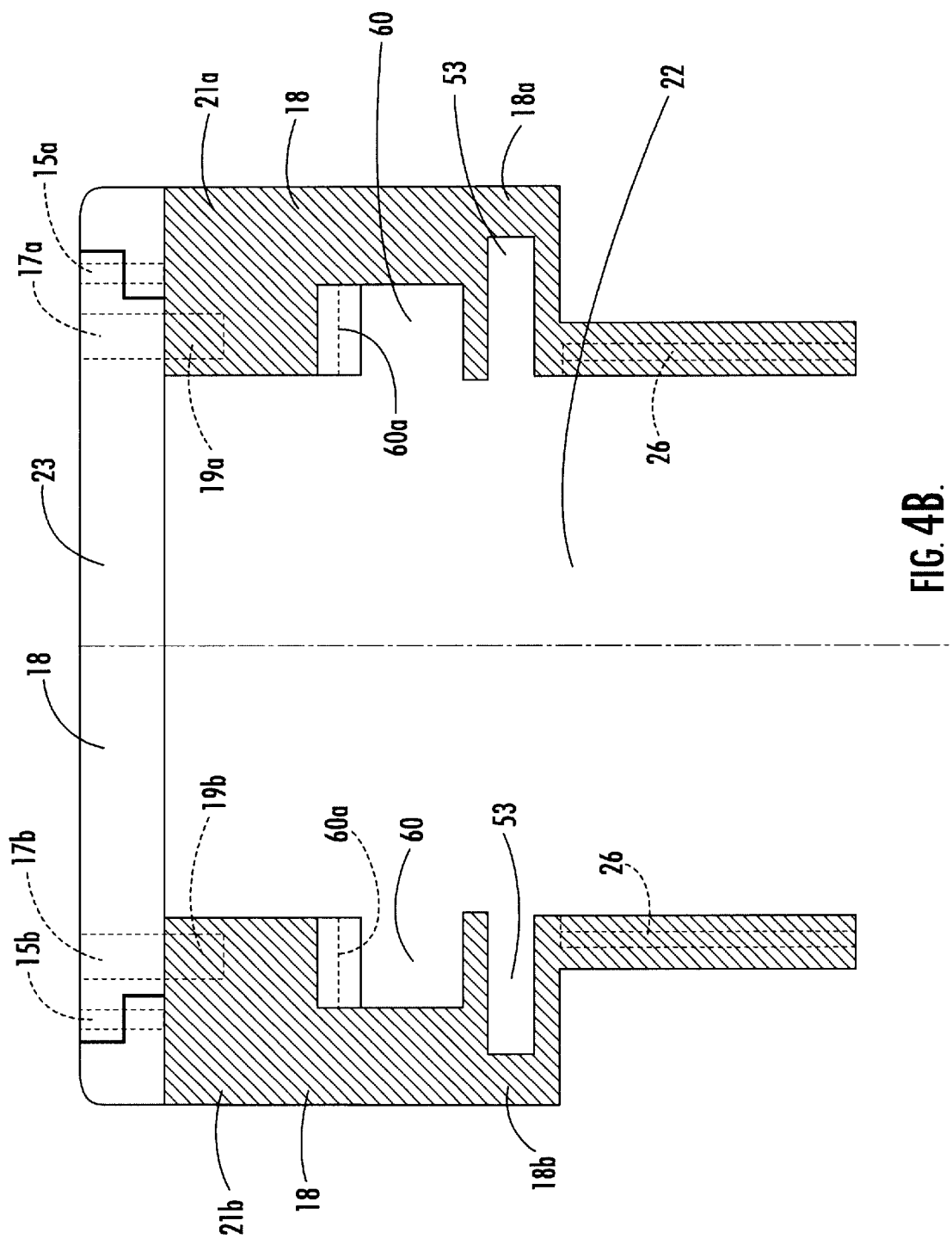
FIG. 4B is a cross-sectional view illustrating the support ring of FIG. 4A.
Figure 4C:
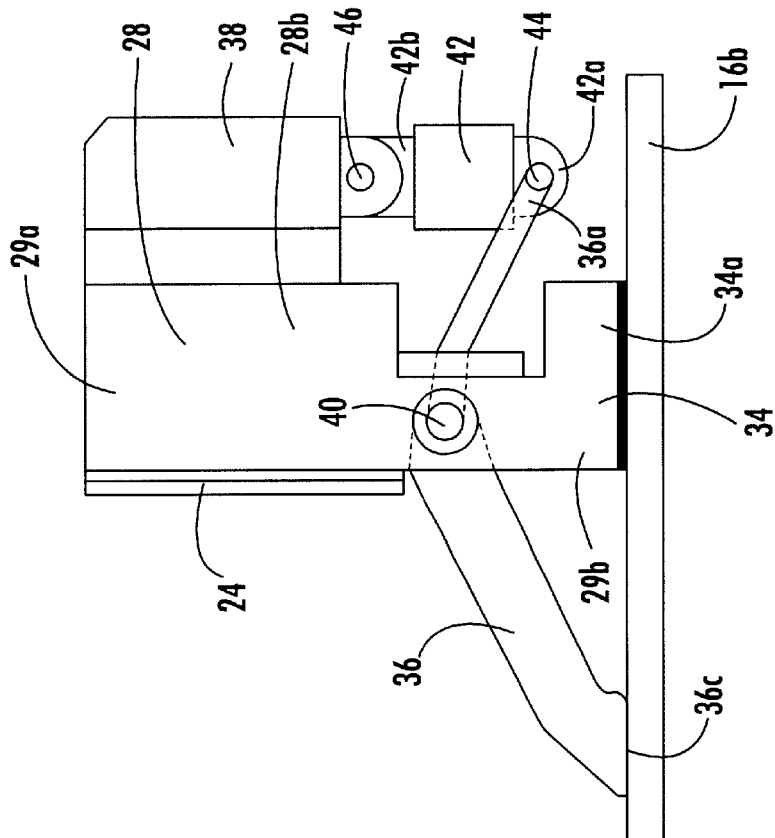
FIG. 4C is an elevational view illustrating the first-side support and second-side support of FIG. 4A.
Figure 4C:
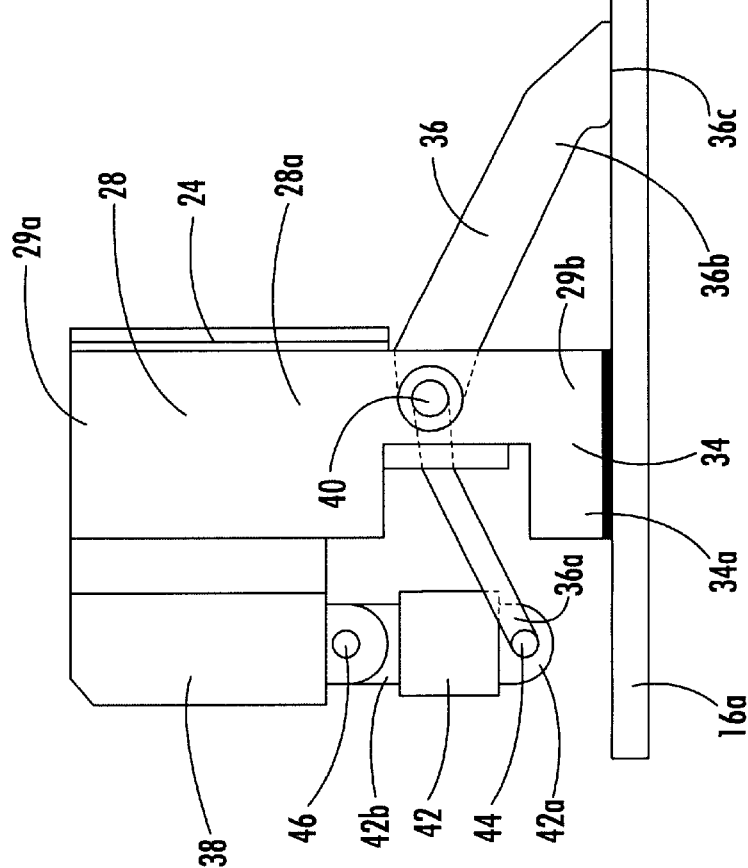

The support ring 18 can be formed as a unitary ring, but, preferably, as illustrated in FIGS. 2A and 4B, is formed of first and second circular members 21a, b having a plurality retaining members 23 extending therebetween. The number of retaining members 23 extending between the first and second circular members 21a, b depends upon the diameter of the circular members and the load requirements of the friction stir welding device 14. Preferably, the plurality of retaining members 23 are equidistantly spaced about the circumference of the first and second circular members 21a, b. Each retaining member 23 includes a pair of alignment pins 15 positioned at either end of the retaining member such that one of the alignment pins 15a corresponds to the first circular member 21a and the other alignment pin 15b corresponds to the second circular member 21b. Each retaining member 23 also defines a pair of threaded apertures 17a, b corresponding to threaded apertures 19a, b in the first and second circular members 21a, b, which receive threaded fasteners, such as bolts, to secure the retaining members to the first and second circular members.

In another embodiment (not shown), the support ring is formed of first and second semicircular members having a clam-shell type configuration. One end of the first semicircular member is connected to a corresponding end of the second semicircular member by a hinge or the like so that the semicircular members can be rotated relative to each other when aligning and securing the abutting ends of the first and second tubular members within the aperture 20. The other end of the first semicircular member is secured to the corresponding end of the second semicircular member by an interlocking latch once the abutting ends of the first and second tubular members 16a, b are positioned within the aperture 20.

As illustrated in FIG. 2A, the first and second sides 18a, b of the support ring 18 define a plurality of supports 28 ("first-side supports" 28a and "second-side supports" 28b) spaced along the circumference of the support ring, which extend from the support ring to the first and second tubular members 16a, b. The supports 28 align the abutting ends of the first and second tubular members prior to and during friction stir welding, as well as provide support to the support ring 18. The first-side supports 28a and second-side supports 28b can be staggered about the circumference of the support ring 18 on opposite sides of the interface defined by the abutting ends of the first and second tubular members 16a, b, but, preferably, each first-side support 28a is positioned opposite a corresponding second-side support 28b.

Each first-side support 28a and second-side support 28b includes first and second ends 29a, b and defines an elongate raised portion or projection 24 along the side of each support 28 that faces the support ring 18. The projection 24 defined along the side of each support 28 is adapted to be slidably received within a groove 26 defined in the corresponding side 18a, b of the support ring 18. As illustrated in FIGS. 3, 4A and 4B, the support ring 18 includes a plurality of actuator assemblies 35, each of which includes a motor 35a, such as an electric, pneumatic or hydraulic motor, that is in operable communication with a corresponding support 28 through an actuator arm 35a that extends from the motor 35a to the first end 29a of the support. In one embodiment, the motor 35a is an air cylinder. Each actuator assembly 35 is adapted to urge the corresponding support 28 toward and away from the corresponding tubular member 16a, b by sliding the projection 24 of the support within the groove 26 of the support ring 18.

The second end 29b of each support 28 preferably includes a primary support 34, an alignment clamp 36 pivotally attached to the primary support, and an actuator assembly 38 in operable communication with the alignment clamp. Each primary support 34 includes a base 34a adapted to contact the surface of the corresponding tubular member 16a, b. The motors 35a of the actuator assemblies 35 are preferably controlled by a controller (not shown), which is in operable communication with a sensor corresponding to each of the motors 35a (not shown), so that the base 34a of each primary support 34 can be moved in unison into and out of contact with the surface of the corresponding tubular member 16a, b. The controller can include a computer, microprocessor, microcontroller or the like operating under software control. The sensors can include a tachometer, digital encoder, dynamometer, pneumatic load cell, hydraulic load cell or the like in operable communication with both the motor 35a and the controller, as is known in the art. To move the base 34a of each primary support 34 into contact with surface of the corresponding tubular member 16a, b, the motor 35a urges the actuator arm 35b toward the first side 29a of the corresponding support 28 to thereby urge the support toward the surface of the tubular member. To move the base 34a of each primary support 34 away from and out of contact with the surface of the corresponding tubular member 16a, b, the motor 35 urges the actuator arm 35a away from the first side 29a of the corresponding support 28 to thereby urge the support away from the surface of the tubular member.

In another embodiment (not shown), each primary support 34 includes a flange defining a plurality of teeth that engage the teeth of a corresponding gear. The support ring includes a plurality of motors, such as electric, pneumatic or hydraulic motors, each of which is in operable communication with a corresponding gear. As discussed above, the motors are preferably controlled by a controller, which is in operable communication with a sensor corresponding to each of the motors, so that the supports 28 can be moved in unison into and out of contact with the surface of the corresponding tubular member 16a, b. To move the base 34a of each primary support 34 into contact with surface of the corresponding tubular member 16a, b, the motor turns the corresponding gear counter-clockwise so that the gear engages the teeth of the corresponding flange to thereby urge the support 28 toward the surface of the tubular member. To move the base 34a of each primary support 34 away from and out of contact with the surface of the corresponding tubular member 16a, b, the motor turns the corresponding gear clockwise so that the gear engages the teeth of the corresponding flange to thereby urge the support 28 away from the surface of the tubular member.

Each support 28 has at least one and, preferably, two alignment clamps 36, each having first and second ends 36a, b. The alignment clamps 36 are pivotally attached to opposite sides of the corresponding primary support 34 through a first pin 40 rotatably mounted within an aperture (not shown) defined by the primary support such that each alignment clamp can be independently operated. The first pin 40 is mounted within the aperture of the primary support 34 by one or more low-friction bushings (not shown). The first end 36a of each alignment clamp 36 is rotatably attached to a corresponding actuator assembly 38. According to one embodiment, as illustrated in FIGS. 3 and 4A, the first end 36a of each alignment clamp 36 is rotatably attached to the first end 42a of a corresponding actuator assembly linkage 42 by a second pin 44. The second end 42b of the actuator assembly linkage 42 is rotatably attached to a pneumatic actuator arm or hydraulic actuator arm of the corresponding actuator assembly 38 by a third pin 46. The actuator assemblies 38 are preferably controlled by a controller (not shown), in operable communication with sensors (not shown), so that the alignment clamps 36 can be moved in unison into and out of contact with the surface of the corresponding tubular member 16a, b. The controller can include a computer, microprocessor, microcontroller or the like operating under software control. The sensors can include a pneumatic load cell, hydraulic load cell or the like in operable communication with the controller and the corresponding actuator assembly, as is known in the art. The second end 36b of each alignment clamp 36 defines a gripping surface 36c for contacting the surface of the corresponding tubular member 16a, b to coaxially align the abutting ends of the tubular members and secure the abutting ends of the tubular members at least partially within the aperture 20 defined by the support ring 18.

To move the second end 36b of each alignment clamp 36 into frictional contact with the surface of the corresponding tubular member 16a, b, the corresponding actuator assembly 38 moves the actuator assembly linkage 42 and the first end 36a of the alignment clamp away from the support ring 18 thereby pivoting the second end 42b of the actuator assembly linkage about the third pin 46, pivoting the first end 36a of the alignment clamp about the second pin 44, and pivoting the alignment clamp about the first pin 40. To disengage the second end 36b of the alignment clamp 36 from the surface of the corresponding tubular member 16a, b, the actuator assembly 38 moves the actuator assembly linkage 42 and the first end 36a of the alignment clamp toward the support ring 18 thereby pivoting the second end 42b of the actuator assembly linkage about the third pin 46, pivoting the first end 36a of the alignment clamp about the second pin 44, and pivoting the alignment clamp about the first pin 40.

Figure 2B:
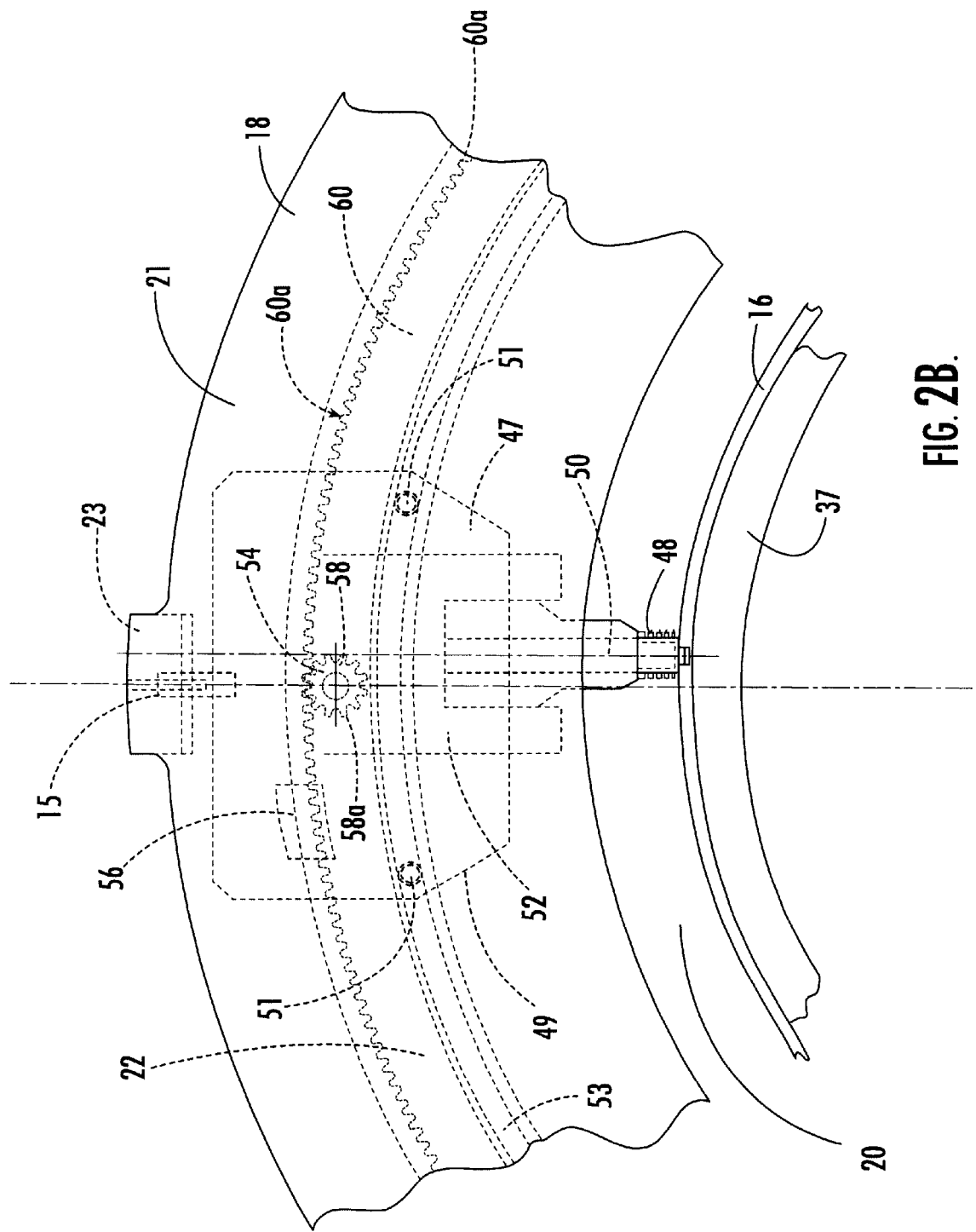
FIG. 2B is a fragmentary end elevational view illustrating the friction stir weld head of the welding device of FIG. 2A.

As illustrated in FIGS. 2B and 3, the friction stir welding device 14 includes at least one friction stir welding tool 48, which is movably and rotatably mounted within the channel 22 defined by the first and second sides 18a, b of the support ring 18 and which projects toward the abutting ends of the first and second tubular members 16a, b. The friction stir welding device of the present invention can be used to weld tubular members having a wide range of dimension, but, preferably, is used to weld heavy wall tubular members having a diameter of approximately 4 to 16 inches. For large diameter tubular members, the welding apparatus 14 can include a plurality of friction stir welding tools 48, which tools preferably are positioned in diametrically opposed pairs about the circumference of the support ring 18 to thereby distribute evenly the loads generated by the friction stir welding process. The welding apparatus also includes means, in operable communication with the friction stir welding tool or tools 48, for rotating the each welding tool, and means, in operable communication with the friction stir welding tool or tools, for moving each welding tool about the abutting ends of the first and second tubular members 16a, b to thereby form the weld joint. According to one embodiment, the rotating means includes a rotatable spindle 50 and a first motor 52 in operable communication with the spindle and the moving means includes a drive assembly 54 and a second motor 56 in operable communication with the drive assembly. The drive assembly 54 can include a belt drive, including a belt or a chain, a gear drive or the like. The first and second motors 52, 56 can include electric, pneumatic or hydraulic motors. Preferably, the first and second motors 52, 56 are controlled by a controller (not shown), in operable communication with sensors (not shown), so that the friction stir welding tool or tools 48 can be rotated and moved in unison about the circumference of the support ring 18 to form a weld joint. The controller can include a computer, microprocessor, microcontroller or the like operating under software control. The sensors can include a tachometer, digital encoder, dynamometer, pneumatic load cell, hydraulic load cell or the like in operable communication with the controller and the corresponding motor 52, 56, as is known in the art.

According to one embodiment, as illustrated in FIGS. 2B and 3, the friction stir welding device 14 includes at least one friction stir weld head 49 movably mounted within the channel 22 of the support ring 18. As discussed above, for large diameter tubular members, the friction stir welding device 14 includes a plurality of friction stir welding heads 49, which heads preferably are positioned in diametrically opposed pairs about the circumference of the support ring 18 to evenly distribute the load generated during the friction stir welding process. Each weld head 49 includes a rotatable spindle 50, a first motor 52 in operable communication with the spindle, and a friction stir welding tool 48 rotatably mounted to the spindle. Each weld head preferably includes a hydraulic motor 52 and hydraulic cylinder 52a. Preferably, the weld-head motor or motors 52 are controlled by a controller (not shown) in operable communication with a sensor (not shown) corresponding to each weld head.

The friction stir welding device 14 also includes means, in operable communication with the one or more friction stir weld heads 49, for moving each weld head along a path defined by the channel 22 of the support ring 18 such that the rotating friction stir weld tool 48 moves along a path defined by the abutting ends of the first and second tubular members 16a, b to thereby form the weld joint. As discussed above, the moving means preferably includes a drive assembly 54 and a second motor 56 in operable communication with the drive assembly. According to one embodiment, as illustrated in FIGS. 2B and 3, the drive assembly 54 includes a pair of gears 58 in operable communication with the second motor 56 through a suitable shaft 59. In one embodiment (not shown), the second motor 56 is a hydraulic motor that supplies an even amount of fluid pressure to two gear motors, each of which corresponds to one of the gears 58. According to this embodiment, the first and second sides 18a, b of the support ring 18 each preferably define a recess 60 along the circumference of the support ring that opens into the channel 22 defined between the first and second sides of the support ring. Each of the recesses 60 is adapted to receive a corresponding gear 58 and defines a plurality of teeth 60a that engage teeth 58a on the outer edge of the gear.

The first and second motors 52, 56 of each weld head are preferably mounted by suitable fasteners (not shown), such as bolts, inside a housing 47 or suitable enclosure that is transported about the circumference of the support ring by the rotation of the pinion gears 58 inside the recesses 60 of the support ring 18. As illustrated in FIGS. 2B and 3, each housing 47 preferably has a pair of guide rollers 51, each of which extends from the housing into a groove 53 defined by the corresponding side of the support ring 18.

During friction stir welding, the rotating friction stir welding tool or tools 48 are plunged into the abutting ends of the first and second tubular members 16a, b. According to one embodiment, the welding apparatus 14 includes means, in operable communication with each the friction stir welding tool 48, for urging the friction stir welding tool toward and away from the abutting ends of the first and second tubular members 16a, b in order to modify the force exerted by the friction stir welding tool on the abutting ends of the first and second tubular members during friction stir welding. According to one embodiment (not shown), the means for urging each friction stir welding tool preferably includes a drive assembly and a motor in operable communication with the drive assembly, and wherein the drive assembly includes a belt drive, gear drive or the like. For example, the assignee of the present application has developed an apparatus and associated method for controlling the downforce of the friction stir welding tool during friction stir welding tool, as disclosed in commonly owned U.S. Pat. No. 6,050,475 entitled "Method and Apparatus for Controlling Downforce During Friction Stir Welding," which issued on Apr. 18, 2000, the entire disclosure of which is hereby incorporated by reference. Additionally, one of the inventors of the present invention has developed an apparatus for adjusting the position of the friction stir welding tool prior to and during friction stir welding, as disclosed in U.S. Pat. No. 5,893,507 entitled "Auto-Adjustable Pin Tool for Friction Stir Welding," which issued Apr. 13, 1999, the entire disclosure of which is hereby incorporated by reference.

As illustrated in FIGS. 2A and 3, prior to friction stir welding the abutting ends of the first and second tubular members 16a, b, tooling 37 is positioned adjacent to the abutting ends of the tubular members opposite the friction stir welding tool 48 and the alignment clamps 36 to support the abutting ends of the tubular members during friction stir welding. The tooling 37 can be removably positioned within the interior of the tubular members by spot welding the tooling to the surface of the tubular members or by constructing a suitable support structure, as is known in the art.

Figure 5:
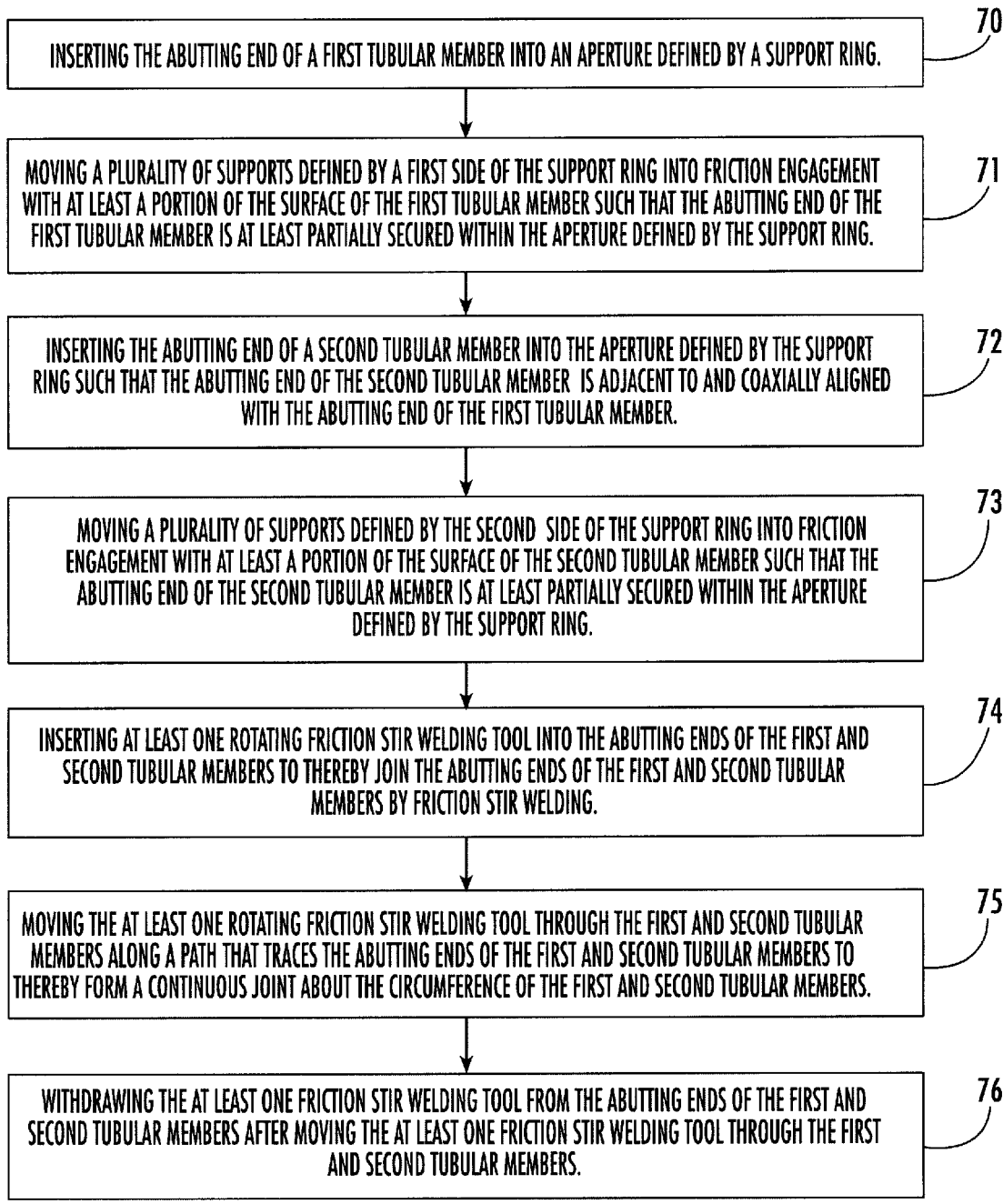
FIG. 5 is a flow chart illustrating a method for friction stir welding, according to one embodiment of the present invention.

As illustrated in FIG. 5, the present invention also provides a method of welding the abutting ends of first and second tubular members, including the steps of inserting the abutting end of a first tubular member into an aperture defined by a support ring. See block 70. A plurality of supports defined by a first side of the support ring are moved into friction engagement with at least a portion of the surface of the first tubular member such that the abutting end of the first tubular member is at least partially secured within the aperture defined by the support ring. See block 71. The abutting end of a second tubular member is inserted into the aperture defined by the support ring such that the abutting end of the second tubular member is adjacent to and coaxially aligned with the abutting end of the first tubular member. See block 72. A plurality of supports defined by the second side of the support ring are moved into friction engagement with at least a portion of the surface of the second tubular member such that the abutting end of the second tubular member is at least partially secured within the aperture defined by the support ring. See block 73. At least one rotating friction stir welding tool is inserted into the abutting ends of the first and second tubular members to thereby join the abutting ends of the first and second tubular members by friction stir welding. See block 74. According to one embodiment, the at least one rotating friction stir welding tool is moved through the first and second tubular members along a path that traces the abutting ends of the first and second tubular members to thereby form a continuous joint about the circumference of the first and second tubular members. See block 75. According to another embodiment, the at least one friction stir welding tool is withdrawn from the abutting ends of the first and second tubular members after moving the at least one friction stir welding tool through the first and second tubular members. See block 76.

Accordingly, there has been provided a welding device and associated method of manufacture for forming friction stir weld joints in workpieces having curvilinear geometries, such as tubular members. The welding device is capable of effectively supporting the tubular members during welding. Additionally, the welding device is capable of effectively translating a friction stir welding tool about the circumference of the tubular members and is easily adaptable to varying tube geometries and sizes.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for forming a weld joint between abutting ends of first and second tubular members, comprising:

a support ring defining an aperture therethrough, said support ring having first and second sides defining a channel therebetween, said first side of said support ring defining a plurality of supports spaced about the circumference of said support ring, each of said first-side supports defining a gripping surface for contacting at least a portion of the surface of the first tubular member to thereby secure the abutting end of the first tubular member at least partially within said aperture of said support ring, said second side of said support ring defining a plurality of supports spaced about the circumference of said support ring, each of said second-side supports defining a gripping surface for contacting at least a portion of the surface of the second tubular member to thereby secure the abutting end of the second tubular member at least partially within said aperture of said support ring adjacent to and coaxially aligned with the abutting end of the first tubular member and wherein said support ring is structured to maintain the coaxial alignment of the first and second tubular members and only externally support said at least one friction-stir welding tool during welding;

at least one friction stir welding tool, said at least one friction stir welding tool movably and rotatably mounted within said channel defined by said support ring and projecting toward the abutting ends of the first and second tubular members;

means for rotating said at least one tool, said rotating means being in operable communication with said at least one friction stir welding tool; and means for moving said at least one tool about the abutting ends of the first and second tubular members to thereby form the weld joint, said moving means being in operable communication with said at least one friction stir welding tool.

2. An apparatus according to claim 1 wherein each of said first-side and second-side supports is slidably mounted to said support ring.

3. An apparatus according to claim 2 further comprising a plurality of actuator assemblies secured to said support ring, each of said plurality of actuator assemblies being in operable communication with one of said supports for urging said support toward and away from the corresponding tubular member to accommodate different diameter tubular members.

4. An apparatus according to claim 1 wherein each of said first-side and second-side supports comprises a primary support, an alignment clamp pivotally attached to said primary support, and an actuator assembly in operable communication with said alignment clamp, said actuator assembly selected from a group consisting of a pneumatic actuator arm and a hydraulic actuator arm.

5. An apparatus according to claim 1 wherein said rotating means comprises a rotatable spindle and a motor in operable communication with said spindle.

6. An apparatus according to claim 1 wherein said moving means comprises a drive assembly and a motor in operable communication with said drive assembly, and wherein said drive assembly is selected from a group consisting of a belt drive and a gear drive.

7. An apparatus according to claim 1 further comprising means for urging said at least one friction stir welding tool toward and away from the abutting ends of the first and second tubular members in order to modify the force exerted by said at least one friction stir welding tool on the abutting ends of the first and second tubular members, said means for urging said at least one friction stir welding tool being in operable communication with said at least one friction stir weld tool.

8. An apparatus according to claim 7 wherein said means for urging said at least one friction stir welding tool comprises a drive assembly and a motor in operable communication with said drive assembly, and wherein said drive assembly is selected from a group consisting of a belt drive and a gear drive.

9. An apparatus for forming a weld joint between abutting ends of first and second tubular members, comprising:

a support ring defining an aperture therethrough, said support ring leaving first and second sides defining a channel therebetween, said first side of said support ring defining a plurality of supports spaced about the circumference of said support ring, each of said first-side supports defining a gripping surface for contacting at least a portion of the surface of the first tubular member to thereby secure the abutting end of the first tubular member at least partially within said aperture of said support ring, said second side of said support ring defining a plurality of supports spaced about the circumference of said support ring, each of said second-side supports defining a gripping surface for contacting at least a portion of the surface of the second tubular member to thereby secure the abutting end of the second tubular member at least partially within said aperture of said support ring adjacent to and coaxially aligned with the abutting end of the first tubular member and wherein said support ring is structured to maintain the coaxial alignment or the first and second tubular members and only externally support said at least one friction-stir welding tool during welding;

at least one friction stir weld head movably mounted within said channel of said support ring, said at least one weld bead comprising:
  a motor having a rotatable spindle;
  a friction stir welding tool, said friction stir welding tool rotatably mounted to said spindle of said motor; and means for moving said at least one weld head along a path defined by said channel of said support ring such that said rotating friction stir tool moves along a path defined by the abutting ends of the first and second tubular members to thereby form the weld joint, said moving means being in operable communication with said at least one friction stir weld head.

10. An apparatus according to claim 9 wherein each of said first-side and second-side supports is slidably mounted to said support ring.

11. An apparatus according to claim 10 further comprising a plurality of actuator assemblies secured to said support ring, each of said plurality of actuator assemblies being in operable communication with one of said supports for urging said support toward and away from the corresponding tubular member to accommodate different diameter tubular members.

12. An apparatus according to claim 9 wherein each of said first-side and second-side supports comprises a primary support, an alignment clamp pivotally attached to said primary support, and an actuator assembly in operable communication with said alignment clamp, said actuator assembly selected from a group consisting of a pneumatic actuator arm and a hydraulic actuator arm.

13. An apparatus according to claim 9 wherein said moving means comprises a drive assembly and a motor in operable communication with said drive assembly, and wherein said drive assembly is selected from a group consisting of a belt drive and a gear drive.

14. An apparatus according to claim 9 further comprising means for urging said at least one friction stir welding tool toward and away from the abutting ends of the first and second tubular members in order to modify the force exerted by said at least one friction stir welding tool on the abutting ends of the first and second tubular members, said means for urging said at least one friction stir welding tool being in operable communication with said at least one friction stir weld tool.

15. An apparatus according to claim 14 wherein said means for urging said at least one friction stir welding tool comprises a drive assembly and a motor in operable communication with said drive assembly, and wherein said drive assembly is selected from a group consisting of a belt drive and a gear drive.

16. A method of welding the abutting ends of first and second tubular members, comprising:

inserting the abutting end of a first tubular member at least partially into an aperture defined by a support ring;

moving a plurality of supports defined by a first side of the support ring into contact with at least a portion of the surface of the first tubular member such that the abutting end of the first tubular member is at least partially secured within the aperture defined by the support ring;

inserting the abutting end of a second tubular member at least partially into the aperture defined by the support ring such that the abutting end of the second tubular member is adjacent to and coaxially aligned with the abutting end of the first tubular member;

moving a, plurality of supports defined by the second side of the support ring into contact with at least a portion of the surface of the second tubular member such that the abutting end of the second tubular member is at least partially secured within the aperture defined by the support ring;

inserting at least one rotating friction stir welding tool into the abutting ends of the first and second tubular member to thereby join the abutting ends of the first and second tubular members by friction stir welding; and maintaining the coaxial alignment of the first and second tubular members, and wherein the support ring is structured to only externally support the at least one friction-stir welding tool during welding.

17. A method according to claim 16 further comprising positioning tooling adjacent to the abutting ends of the first and second tubular members opposite the friction stir welding tool to support the abutting ends of the first and second tubular members during friction stir welding.

18. A method according to claim 16 wherein said first and second moving steps comprise:

moving a primary support into contact with at least a portion of the surface of the corresponding tubular member; and thereafter, moving an alignment clamp into contact with at least a portion of the surface of the corresponding tubular member.

19. A method according to claim 16 further comprising moving the at least one rotating friction stir welding tool through the first and second tubular members along a path that traces the abutting ends of the first and second tubular members to thereby form a continuous joint about the circumference of the first and second tubular members.

20. A method according to claim 19 further comprising withdrawing the at least one friction stir welding tool from the abutting ends of the first and second tubular members after moving the at least one friction stir welding tool through the first and second tubular members.

21. An apparatus for forming a weld joint between abutting ends of first and second tubular members, comprising:

a support ring defining an aperture therethrough, said support ring having first and second sides defining a channel therebetween, said first side of said support ring defining a plurality of supports spaced about the circumference of said support ring, each of said first-side supports defining a gripping surface for contacting at least a portion of the surface of the first tubular member to thereby secure the abutting end of the first tubular member at least partially within said aperture of said support ring, said second side of said support ring defining a plurality of supports spaced about the circumference of said support ring, each of said second-side supports defining a gripping surface for contacting at least a portion of the surface of the second tubular member to thereby secure the abutting end of the second tubular member at least partially within said aperture of said support ring adjacent to and coaxially aligned with the abutting end of the first tubular member, and wherein each of said first-side and second-side supports comprises a primary support, an alignment clamp pivotally attached to said primary support, and an actuator assembly in operable communication with said alignment clamp, said actuator assembly selected from a group consisting of a pneumatic actuator arm and a hydraulic actuator arm;

at least one friction stir welding tool, said at least one friction stir welding tool movably and rotatably mounted within said channel defined by said support ring and projecting toward the abutting ends of the first and second tubular members;

means for rotating said at least one tool, said rotating means being in operable communication with said at least one friction stir welding tool; and means for moving said at least one friction stir welding tool at least one tool about the abutting ends of the first and second tubular members to thereby form the weld joint, said moving means being in operable communication with said at least one tool.

22. An apparatus according to claim 21 wherein each of said first-side and second-side supports is slidably mounted to said support ring.

23. An apparatus according to claim 22 further comprising a plurality of actuator assemblies secured to said support ring, each of said plurality of actuator assemblies being in operable communication with one of said supports for urging said support toward and away from the corresponding tubular member to accommodate different diameter tubular members.

24. An apparatus according to claim 21 wherein said rotating means comprises a rotatable spindle and a motor in operable communication with said spindle.

25. An apparatus according to claim 21 wherein said moving means comprises a drive assembly and a motor in operable communication with said drive assembly, and wherein said drive assembly is selected from a group consisting of a belt drive and a gear drive.

26. An apparatus according to claim 21 further comprising means for urging said at least one friction stir welding tool toward and away from the abutting ends of the first and second tubular members in order to modify the force exerted by said at least one friction stir welding tool on the abutting ends of the first and second tubular members, said means for urging said at least one friction stir weld tool being in operable communication with said at least one tool.

27. An apparatus according to claim 26 wherein said means for urging said at least one friction stir welding tool comprises a drive assembly and a motor in operable communication with said drive assembly, and wherein said drive assembly is selected from a group consisting of a belt drive and a gear drive.

28. An apparatus for forming a weld joint between abutting ends of first and second tubular members, comprising:

a support ring defining an aperture therethrough, said support ring having first and second sides defining a channel therebetween, said first side of said support ring defining a plurality of supports spaced about the circumference of said support ring, each of said first-side supports defining a gripping surface for contacting at least a portion of the surface of the first tubular member to thereby secure the abutting end of the first tubular member at least partially within said aperture of said support ring, said second side of said support ring defining a plurality of supports spaced about the circumference of said support ring, each of said second-side supports defining a gripping surface for contacting at least a portion of the surface of the second tubular member to thereby secure the abutting end of the second tubular member at least partially within said aperture of said support ring adjacent to and coaxially aligned with the abutting end of the first tubular member, and wherein each of said first-side and second-side supports comprises a primary support, an alignment clamp pivotally attached to said primary support, and an actuator assembly in operable communication with said alignment clamp, said actuator assembly selected from a group consisting of a pneumatic actuator arm and a hydraulic actuator arm;

at least one friction stir weld head movably mounted within said channel of said support ring, said at least one weld head comprising:
a motor having a rotatable spindle;
a friction stir welding tool, said friction stir welding tool rotatably mounted to said spindle of said motor; and means for moving said at least one weld head along a path defined by said channel of said support ring such that said rotating friction stir tool moves along a path defined by the abutting ends of the first and second tubular members to thereby form the weld joint, said means for moving said at least one weld head being in operable communication with said at least one friction stir weld head.

29. An apparatus according to claim 28 wherein each of said first-side and second-side supports is slidably mounted to said support ring.

30. An apparatus according to claim 29 further comprising a plurality of actuator assemblies secured to said support ring, each of said plurality of actuator assemblies being in operable communication with one of said supports for urging said support toward and away from the corresponding tubular member to accommodate different diameter tubular members.

31. An apparatus according to claim 28 wherein said moving means comprises a drive assembly and a motor in operable communication with said drive assembly, and wherein said drive assembly is selected from a group consisting of a belt drive and a gear drive.

32. An apparatus according to claim 28 further comprising means for urging said at least one friction stir welding tool toward and away from the abutting ends of the first and second tubular members in order to modify the force exerted by said at least one friction stir welding tool on the abutting ends of the first and second tubular members, said means for urging said at least one friction stir welding tool being in operable communication with said at least one tool.

33. An apparatus according to claim 32 wherein said means for urging said at least one friction stir welding tool comprises a drive assembly and a motor in operable communication with said drive assembly, and wherein said drive assembly is selected from a group consisting of a belt drive and a gear drive.

* * * * *

UNITED STATES PATENT AND TRADEMARK OFFICE
CERTIFICATE OF CORRECTION

PATENT NO.    : 6,450,395 B1
DATED         : September 17, 2002
INVENTOR(S)   : Weeks et al.

It is certified that error appears in the above-identified patent and that said Letters Patent is hereby corrected as shown below:

Column 11,
Line 10, "leaving" should read -- having --;
Line 27, "or" should read -- of --;
Line 32, "bead" should read -- head --.

Column 12,
Line 28, "a" cancel the comma (,);
Lines 35-36, "member" should read -- members --.

Signed and Sealed this

Fourth Day of February, 2003

JAMES E. ROGAN
*Director of the United States Patent and Trademark Office*